United States Patent [19]

Sharpe

[11] Patent Number: 5,675,342

[45] Date of Patent: Oct. 7, 1997

[54] AUTOMATIC VEHICLE IDENTIFICATION SYSTEM CAPABLE OF VEHICLE LANE DISCRIMINATION

[75] Inventor: Claude Andrew Sharpe, McKinney, Tex.

[73] Assignee: Texas Instruments Incorporated, Dallas, Tex.

[21] Appl. No.: 454,478

[22] Filed: May 30, 1995

Related U.S. Application Data

[63] Continuation of Ser. No. 21,123, Feb. 23, 1993.

[51] Int. Cl.[6] .................................................. G01S 13/76
[52] U.S. Cl. ................................ 342/42; 342/44; 342/50; 340/928; 340/825.54
[58] Field of Search ........................... 342/42, 44, 50, 342/51; 340/825.34, 825.54, 901, 938, 928

[56] References Cited

U.S. PATENT DOCUMENTS

| | | | |
|---|---|---|---|
| 3,775,742 | 11/1973 | Koerner et al. | 340/938 |
| 4,112,421 | 9/1978 | Freeny, Jr. | 342/457 |
| 4,338,587 | 7/1982 | Chiapetti | 340/928 |
| 4,739,328 | 4/1988 | Koelle et al. | 342/44 |
| 4,888,591 | 12/1989 | Landt et al. | 342/44 |
| 4,912,471 | 3/1990 | Tybyrski et al. | 342/42 |
| 5,055,659 | 10/1991 | Hendrick et al. | 235/439 |
| 5,086,389 | 2/1992 | Hassett et al. | 364/401 |
| 5,128,669 | 7/1992 | Dadds et al. | 340/901 |
| 5,144,553 | 9/1992 | Hassett et al. | 364/401 |
| 5,164,732 | 11/1992 | Brockelsby | 342/44 |
| 5,192,954 | 3/1993 | Brockelsby | 342/42 |
| 5,227,803 | 7/1993 | O'Connor et al. | 342/442 |
| 5,253,162 | 10/1993 | Hassett et al. | 364/405 |
| 5,581,249 | 12/1996 | Yoshida | 340/928 |
| 5,589,827 | 12/1996 | Scurati | 340/901 |
| 5,591,951 | 1/1997 | Doty | 235/435 |
| 5,602,538 | 2/1997 | Orthmann et al. | 340/825.54 |
| 5,602,919 | 2/1997 | Hurta et al. | 380/24 |

FOREIGN PATENT DOCUMENTS

| | | |
|---|---|---|
| 0 401 102 | 5/1990 | European Pat. Off. . |
| 0 420 180 A1 | 4/1991 | European Pat. Off. . |

*Primary Examiner*—John B. Sotomayor
*Attorney, Agent, or Firm*—Rebecca A. Mapstone; Richard A. Donaldson; Jay M. Cantor

[57] ABSTRACT

A method of identifying an object and determining in which of at least two areas the object is located is disclosed. The method includes the steps of: focusing a first directional antenna (18) on a first area (28a), focusing a second directional antenna on a second area (28b), transmitting a first field strength pulse (44) from said first directional antenna (18), transmitting a second field strength pulse (46) from said second directional antenna (18), and comparing in a transponder (14) the first field strength pulse (44) to the second field strength pulse (46) to determine in which of the two areas (28a, 28b) the transponder (14) is located. Other devices, systems and methods are also disclosed.

37 Claims, 3 Drawing Sheets

AUTOMATIC VEHICLE IDENTIFICATION SYSTEM CAPABLE OF VEHICLE LANE DISCRIMINATION

This is a Continuation of application Ser. No. 08/021,123, filed Feb. 23, 1993.

FIELD OF THE INVENTION

This invention generally relates to a transponder arrangement in which an interrogator or reader unit communicates with a remote tag or transponder. Particularly, a plurality of interrogators focus directional antennas on selected areas. Transponders in one of these selected areas can determine its assigned interrogator by comparing the amplitude of a transmission received from one of the interrogators to that received from another.

BACKGROUND OF THE INVENTION

Without limiting the scope of the invention, the invention will be described in the context of an Automatic Vehicle Identification (AVI) system capable of vehicle lane discrimination. In automatic toll booth systems employing RF data links for vehicular identification, it may be necessary to determine in which of two adjacent lanes a vehicle is traveling. For example, it is sometimes necessary to discriminate between lanes for billing purposes when some lanes are designated as high occupancy vehicle lanes and may charge a differing toll than other lanes.

Previous attempts to solve the problem of vehicle lane discrimination have relied on buried sensors in the roadway which detect the presence of a vehicle and communicate with the vehicle using low frequency RF signals which are very localized in space and provide lane discrimination. This system has a disadvantage of requiring the tearing up of a roadway to mount the interrogator antenna.

SUMMARY OF THE INVENTION

A method for identifying an object and determining the location of an object is disclosed. The method includes the steps of: focusing a first directional antenna on a first area, focusing a second directional antenna on a second area, transmitting a first field strength pulse from the first directional antenna, transmitting a second field strength pulse from the second directional antenna, and comparing in a transponder the first field strength pulse to the second field strength pulse to determine in which of the two areas the transponder is located.

In the preferred embodiment of the present invention the method relates to an Automatic Vehicle Identification (AVI) system capable of vehicle lane discrimination. In automatic toll booth systems employing RF data links for vehicular identification, it may be necessary to determine in which of two adjacent lanes a vehicle is traveling. Within the vehicle is a tag or a transponder which receives the interrogation signal from the transmitter of the interrogator or reader and can reply to the interrogation unit by backscatter modulating a continuous wave input. The receiver of the interrogator then decodes the backscatter modulated signal and may relay the information contained in this signal to a control circuit which, for example, might log the information into a memory. An analogous principle to the backscatter modulation of a continuous wave signal is that of an LCD wristwatch which sends the wearer data based on reflected light. The preferred embodiment allows each transponder to determine its lane location by comparing the field strengths of the interrogation signals of each lane. By comparing the field strengths, an effective discrimination for lane boundary can be provided. Each transponder can then be polled separately by an interrogator associated with each lane. Further details of the method for comparing field strengths for the relative interrogation signals will be further described herein.

BRIEF DESCRIPTION OF THE DRAWINGS

In the drawings.

Corresponding numerals and symbols in the different figures refer to corresponding parts unless otherwise indicated.

DETAILED DESCRIPTION OF PREFERRED EMBODIMENTS

Figure 1:
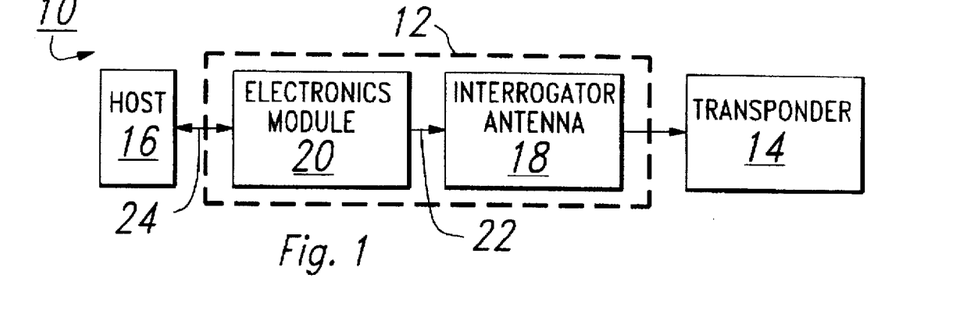
FIG. 1 is a block circuit diagram of the preferred embodiment Automatic Vehicle Identification System.
Figure 2:
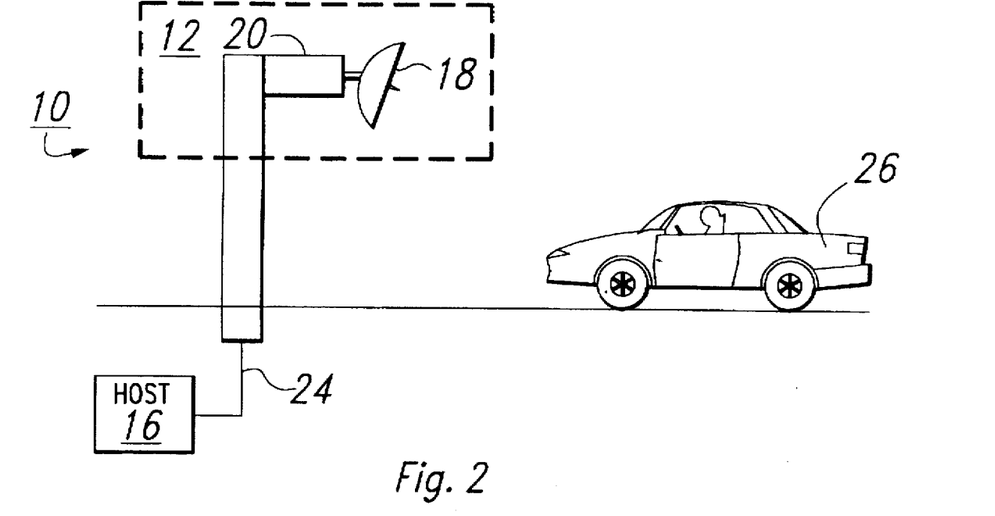
FIG. 2 is a side view of a typical installation of the preferred embodiment Automatic Vehicle Identification System.

A block diagram of the preferred embodiment AVI system 10 is shown in FIG. 1. This system includes an interrogator 12, a transponder 14, and preferably a toll plaza computer 16. Preferably, one interrogator 12 is provided for each lane in which an RF data link is to be maintained. Except internal electrical parameters which may or may not be the same, all interrogators 12 are identical. Such internal electrical parameters comprise of: interrogator lane position, control parameters, and reference frequency. The role of the interrogator 12 in this application is: to trigger or activate a transponder 14, to poll the transponder 14 for specific information, and to acknowledge to the transponder 14 that a valid data exchange has taken place. As shown in FIG. 2, the interrogator 12 has an antenna 18 which is preferably a slotted wave guide overhead antenna 18, and is mounted approximately 30 feet above the roadway. Preferably, the antenna 18 will have circular polarization, but advantages may exist which will motivate the use of other choices of polarization including linear and elliptical. The interrogator electronics 20 are connected to this antenna 18 by suitable cable, such as for example an RF coax 22. The interrogator 12 communicates in a wireless fashion with the transponder 14 by sending on/off keying modulated signals to the transponder 14. interrogator 12 then sends a continuous wave RF signal to the transponder 14. The transponder 14 may respond to the interrogator 12 by backscatter modulating the continuous wave signal such as described in U.S. Pat. No. 4,739,328 by Koelle, et al. Details of the communication between the interrogator 12 and the transponder 14 will be further described herein. Connection 24 between the interrogator 12 and a toll plaza computer 16 as shown in FIG. 1 may be an RS232 or RS422 connection, either connection being well known in the art of computer interconnection.

Figure 5:
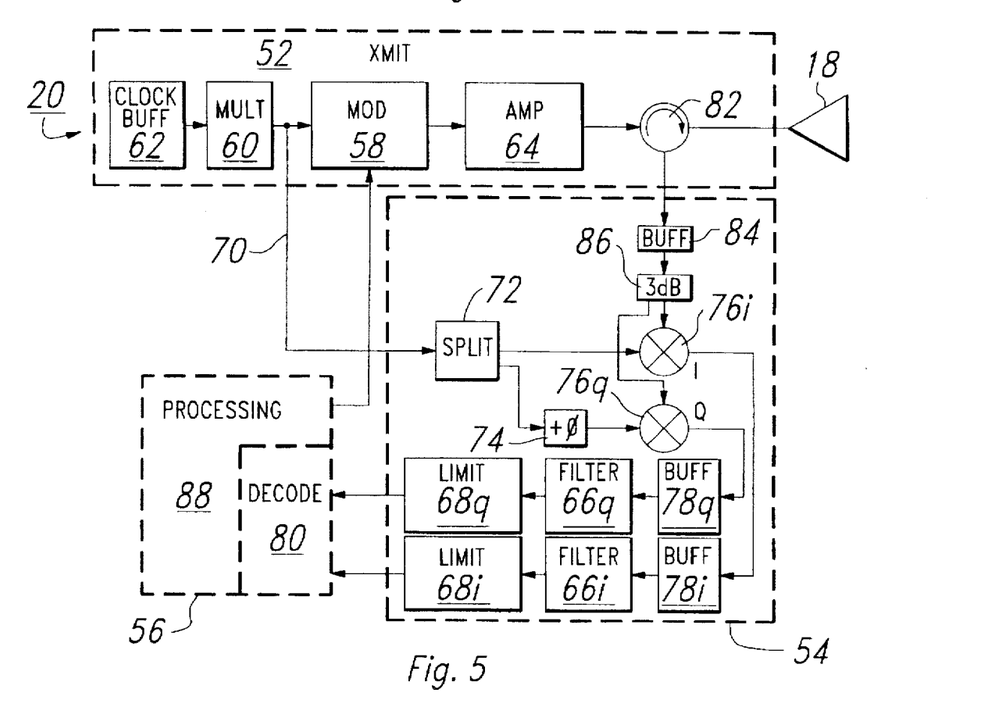
FIG. 5 is a more detailed block circuit diagram of the interrogator of the preferred embodiment.

The interrogator 12 of FIG. 1 is housed in two modules: the electronics module 20 and the antenna 18. As shown in FIG. 5, the electronics module 20 contains the transmitter 52 and the receiver 54 and the control circuit 56. The module 20 may be designed to operate in a controlled environment, making use of appropriate heating and forced air cooling to comply with the temperature extremes which may be encountered. The antenna module 18 typically consists of the antenna and any appropriate control electronics which may be required. The interconnection between the antenna 18 and the electronics module 20 consists of a low-loss RF interconnect 22, which is typically a coaxial cable and a multiconductor cable capable of supplying power and control signal information. The antenna 18 is preferably weatherproof but not temperature-controlled.

FIG. 2 shows a side view of a typical AVI system 10 installation. In this figure a vehicle 26 travels on a vehicle lane and approaches the interrogator 12. A transponder 14 is located on or within a vehicle 26. Preferably the transponder 14 is mounted to the vehicle front window. In certain applications such as in unusually large vehicles other locations might be appropriate. As shown in the figure, the vehicle 26 carrying the transponder 14 approaches the interrogator 12 at the toll plaza. Further details regarding the communication between the transponder 14 and the interrogator 12 will be discussed herein. The components of this system will also be discussed in greater detail.

Figure 3:
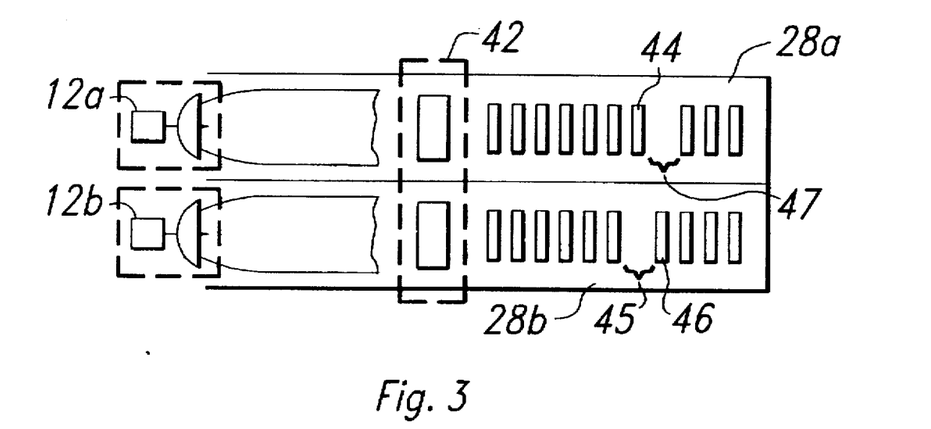
FIG. 3 is a top view of two adjacent lanes using the preferred embodiment Automatic Vehicle Identification System and provides an overview of the timing sequence of the wake up burst and downlink message.
Figure 4:
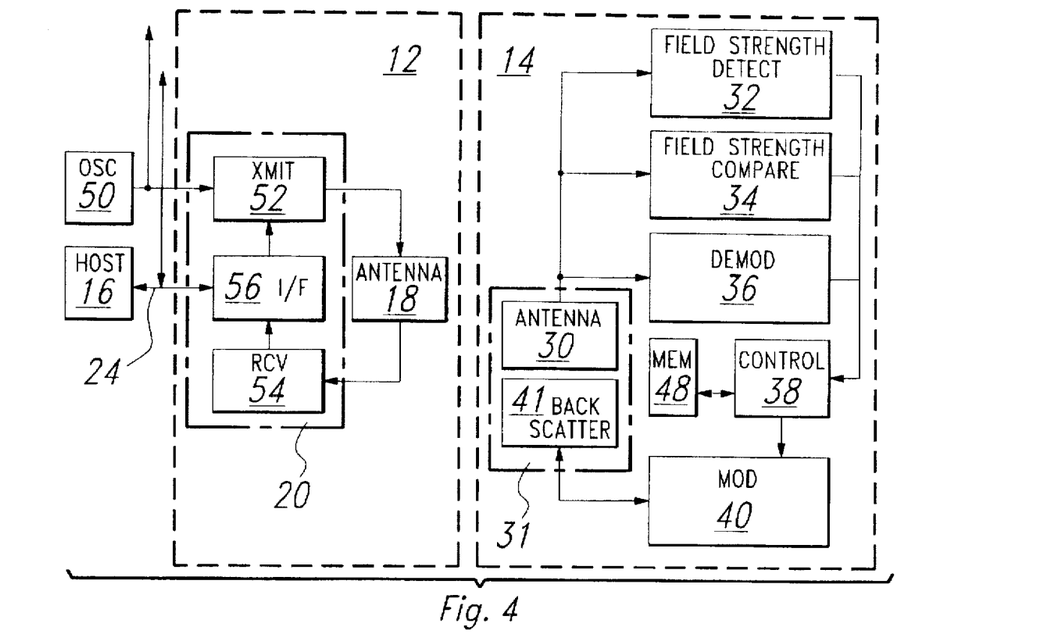
FIG. 4 is a block circuit diagram of the preferred embodiment Automatic Vehicle Identification Vehicle Identification System showing block circuit diagrams of the interrogator and the transponder.

FIG. 3 is a top view of an AVI system 10 comprising two lanes. Two lanes are shown merely for illustration purposes. It will be obvious to one of ordinary skill in the art that this system could be applied to multiple lanes. FIG. 4 provides a block diagram of the major components of the AVI system 10. Firstly, the preferred embodiment transponder 14 will be described with reference to FIG. 4 together with FIGS. 2 and 3. The AVI system 10 is capable of vehicle lane discrimination and has directional antennas, each antenna 18 focused on an associated vehicle lane 28a,28b. A vehicle 26 or vehicles may travel on each lane, each vehicle 26 carrying a remote transponder 14. Each transponder 14 preferably comprises: an antenna 30, a field strength detector 32, a field strength comparator 34, a field demodulator 36, a transponder control circuit 38, a backscatter modulator 40, and a modulated reflector 41.

With further reference to FIGS. 3 and 4, the transponder antenna 30 is operable to receive RF transmissions from the interrogator 12. The field strength detector 32 converts a signal supplied by the transponder antenna 30 to a voltage which upon exceeding a threshold activates the transponder 14. According to one embodiment the threshold for activation is 500 mV/m²±0.8 dB, however it is anticipated that system designs can be accomplished while maintaining a wider threshold for activation. Activation preferably occurs quickly after receiving this signal level to maximize the mount of time available for communication. The field strength comparator 34 then compares a first field strength pulse 44 received from a first directional antenna 18 to a second field strength pulse 46 received from the second directional antenna 18. The results of this field strength comparison may then be relayed to the control circuit 38 so the transponder 14 may then respond only to messages from the appropriate interrogator 12 (i.e., the interrogator associated with the lane in which the transponder 14 is travelling). A field demodulator 36 is then operable to demodulate a downlink message (which in the preferred embodiment is amplitude demodulated) from the appropriate interrogator 12. The control circuit 38 receives the demodulated downlink message and then may take appropriate action or store the message in a memory 48. With direction from the control circuit 38, the backscatter modulator 40 is then operable to backscatter modulate a continuous wave signal sent by the interrogator 12 to generate an uplink message via a modulated reflector. Preferably, a memory 48 is provided which the control circuit 38 can access to provide data to the backscatter modulator 40 for transmission. In the described embodiment, memory 48 is a read/write non-volatile memory having a capacity of at least 2K bytes, however, it is anticipated that volatile memory and read-only memory (ROM) could be used and that memories having a lesser capacity than 2K could be implemented in an AVI system 10 or in other systems.

The transponder control circuit 38 is typically an application specific integrated circuit (ASIC), which processes the downlink message received from the transmitter and formulates the necessary reply data. It then provides the properly formatted reply data stream to a transponder modulator 40. This ASIC, or control circuit 38, might be a simple digital system using a fixed format, or a more versatile digital processing system which can incorporate a number of options. Many options can be envisioned for the ASIC to accomplish, examples include but are not limited to: data storage, data exchange history, and battery capacity warning. The transponder modulator 40 shown in the figure accepts the data stream from the control circuit 38 and modulates the reflectivity or radar cross section (RCS) of the modulated reflector 41 in a controlled manner. Modulated reflector 41 is modulated by changing its apparent wave length, preferably between one fourth and one half the carrier wave length. When the apparent wave length of the modulated reflector 41 is ½λ, then the antenna 30 should reflect a large portion of the incident carrier energy. When the modulated reflector 41 has an apparent length of ¼λ, it will reflect very little of the incident carrier. As is well known in the art, a switching of an antenna between ½λ and ¼λ can be accomplished by connecting or disconnecting two ¼λ stubs. For the described embodiment, the change in RCS is preferably between 45 cm² and 100 cm². By varying the RCS according to the specified format, data is sent from the transponder 14 to the interrogator 12. The modulated reflector 41 also acts to receive RF signals and transmit these RF signals to the activator and the receiver. The transponder electronics assemblies typically are self-contained on a small credit card size assembly which is completely portable. Preferably an internal battery is provided to give operating power to the transponder 14. Alternatively the transponder 14 might gain its operating power directly from the RF signal. Although the modulated reflector 41 is described as a separate element from the transponder antenna 30, it is possible for both elements to be integrated into a single integrated antenna 31.

Now that the components of the transponder 14 have been described, with further reference to FIG. 4 together with FIG. 3, the preferred embodiment interrogator 12 will now be described. The interrogator 12 is located at a toll plaza. The system includes a common reference oscillator 50 which generates at its output 51 a reference carrier wave for synchronization of the interrogators 12. Each interrogator 12 has a directional antenna 18 and a transmitter 52 which transmit a wake-up burst 42 which is of sufficient field strength at a pre-selected distance to trigger a transponder 14 being carried in a vehicle 26 in the interrogator's associated vehicle lane 28a,28b. The interrogator 12 then transmits a downlink message to the remote transponder 14, the downlink message preferably being transmitted using On-Off Keying. Upon completion of the downlink message, the transmitter 52 then transmits a continuous wave illumination signal onto the transponder 14 so the transponder 14 may backscatter modulate the continuous wave illumination signal to generate the uplink message. The interrogator 12 further includes a receiver 54 for reception of the uplink message and for separation of the uplink message from spurious non-modulated reflections. The interrogator transmitter 52 and receiver 54 operate under control of a control circuit 56. Control circuit 56 directs the transmitter 52 to send the wake-up burst 42, followed by the downlink message.

To allow proper lane discrimination, a first interrogator 12a sends a first downlink message having a first field strength pause 45 during which no RF energy is transmitted and a second interrogator 12b in an adjacent lane from then sends a second downlink message having a second field strength pause 47. During each pause 45,47 the counterpart interrogator 12 sends a pulse 44,46. In this manner a transponder 14 travelling in a vehicle 26 in one of the lanes 28a,28b associated with each interrogator 12a,12b can determine by comparing the amplitude of the pulse 44,46 received during the first and second field strength pauses 45,47 in which of the two lanes 28a,28b it is travelling. The control circuit 56 is still further operable to direct the transmitter 52 to send the continuous wave illumination signal following the downlink message and to simultaneously direct the receiver 54 to receive the uplink message.

Now that the major components of the transponder 14 have been described in some detail, the electronic components 20 of the interrogator 12 will be described in more detail with respect to FIG. 5. The electronics 20 comprise a transmitter 52 which is operable to send signals to the antenna 18. Typically transmitter 52 receives signals from the toll plaza computer 16 via the host connection 24. During the transponder reply the transmitter 52 illuminates the transponder 14 with a constant RF signal which the transponder 14 then backscatter modulates with the reply data. The receiver 54 detects the reflected energy which is backscatter modulated by the transponder 14 and separates the modulated signal from the non-modulated reflections. Antenna 18, shown here in electrical communication with the transmitter 52 and the receiver 54, is a directional antenna 18 with a precisely shaped pattern and is used to illuminate a portion of each lane during the data exchange between the toll plaza and the vehicle 26. In the described embodiment, a single antenna 18 is used for both the downlink message and the uplink message. The antenna 18 is typically mounted overhead and is positioned to ensure a constant link between the interrogator 12 and the transponder 14 regardless of site dependent variations. Also shown is the control circuit or host computer interface 56 used to communicate with a toll plaza computer 16 which would control all the interrogators 12 at a single toll plaza. The computer interface 56 between the interrogator 12 and the toll plaza computer 16 accepts information from the toll plaza computer 16 via the host connection 24 and formats the data for transmission to the vehicle 26 by means of the transmitter 52. The computer interface 56 also decodes the reply data from the transponder 14 by means of the receiver 54 and supplies this reply data to the toll plaza computer 16. Typically, except for the antenna 18, the components of the interrogator 12 are located in a weatherproof, temperature controlled environment. The antenna 18 is weatherproof and is designed to operate over the anticipated temperature extremes in its environment.

For multiple lanes, one interrogator 12 will preferably be provided for each lane. All interrogators at toll location will be coordinated in frequency, power output and antenna pattern to prevent overlap of coverage and interference between adjacent lanes. A different carrier frequency is typically used in each or adjacent interrogators 12, however, a common carrier frequency might be used in all interrogators 12.

As shown in FIG. 5, the modulator 58 of the transmitter 52 section receives data from the control circuit 56 and provides a modulated output for the antenna 18 to transmit information to the transponder 14. Further shown in FIG. 5, is a clock frequency multiplier 60 which converts the reference carrier received from output 51 of reference oscillator 50 to a highly stable channel frequency of nominally 915 MHz. To prevent deleterious loading effects on the reference carrier, a buffer 62 is provided. Spurious signals which lie outside the desired carrier frequency may be rejected by bandpass filtering.

In the described embodiment, a power amplifier 64 is provided to amplify the modulated carrier wave to approximately 200 mW, although it is anticipated that a considerable range of power outputs of amplifier 64 can be used depending on the needs of the specific application. The output of the amplifier 64 may be protected using circuitry well known to one of ordinary skill in the art to allow infinite standing-wave ratio (SWR) conditions between the output and the antenna 18 to occur without damage. Preferably the amplifier 64 is located in the temperature controlled environment of the interrogator 12. However, as an alternative to minimize transmission losses between the transmitter 52 and antenna 18, the amplifier 64 may be located inside the antenna 18.

The receiver 54 of the interrogator 12 detects the backscatter modulated return signal from the transponder 14. The amplitude and phase of the return signal will be completely dependent upon the multitude of reflections which occur from a number of sources. Undesired sources of return include the following: vehicles 26 in the same lane as the interrogator 12 creating beamfilling or non-beamfilling unmodulated returns; vehicles 26 in adjacent lanes 28a,28b creating unmodulated and backscatter modulated returns; fixed obstacles of unknown composition creating unmodulated returns; and leakage from the transmitter 52 to the receiver 54 during illumination of the transponder 14. The return is processed by suitable filtering and limiting by bandpass filters 66i,66q and limiters 68i,68q.

The signals may be extracted from the modulated return signal using a homodyne I/Q approach. For this application a local oscillator signal 70 (L.O.) is provided from the same frequency multiplier 60 which excites the transmitter 52. This signal is divided to provide two outputs which are 90 degrees out of phase. These signals, known as the "in phase" or "I" clock and the "quadrature" or "Q" clock are provided by using a buffer 72 and a 90° phase shifter 74. The "I" and "Q" signals are generated by providing the I/Q clocks to two mixers 76i,76q which mixes the signals with a half-power portion of the received signals. Among other things the receiver 54 will receive 915 MHz carrier leakage signal and 915 MHz target reflections. Since the incident phase of these received signals is not known, the I/Q approach must be used to separate the desired, coherent signals from the many reflections and leakage signals having unknown phase and amplitude. The information in the backscatter modulated return signal is contained on synchronous AM side bands, therefore the local oscillator 70 frequency must be phase synchronous with the original backscatter carrier. Since the phase of these signals is not known, the I/Q demodulation is provided to allow for all combinations of incident phase. From the mixers 76$i$,76$q$, the "I" and "Q" signals then pass through buffers 78$i$,78$q$, bandpass filters 66$i$,66$q$, and limiters 68$i$,68$q$ before being passed on to the I/Q digital FSK decoder 80 for reconstruction. The I/Q method of extracting a baseband coherent signal from a noisy environment is well known in the art and is described, for instance, on pp 254–267, "Introduction to Communication Systems," 2nd Edition by Ferrel Stremler. The incidence signal from the antenna 18 is first provided to the mixers 76$i$,76$q$ through a circulator 82 which makes the connection to the antenna 18 full duplex to radiate signals from the transmitter 52 and to receive signals to pass on to the receiver 54. This signal then preferably passes through a bandpass filter 84 and is split between I/Q mixers 76$i$,76$q$ using a 3 dB coupler 86. The signal from these mixers typically then passes through a buffer, a bandpass filter, and a limiter before being passed on to the I/Q digital FSK decoder 80 for reconstruction. The desired base band signal is preferably a frequency shift keying (FSK) signal which, for example, would use a 600 kHz signal for a space (or "0") and a 1200 kHz for a mark (or "1") with a 300 kHz bit frequency. The information contained in the transponder 14 has now been superimposed onto the illumination signal from the transmitter 52, detected by the receiver 54 of the interrogator 12 and is sent to a control circuit 56 which includes decoding and demodulation circuitry 80.

Preferably one interrogator 12 is provided for each lane in which a data link is to be maintained. Except site-programmable internal electrical parameters such as lane location, or other controlled parameters, all interrogators 12 are identical and are coordinated in frequency by a common reference oscillator 50.

Figure 6A:
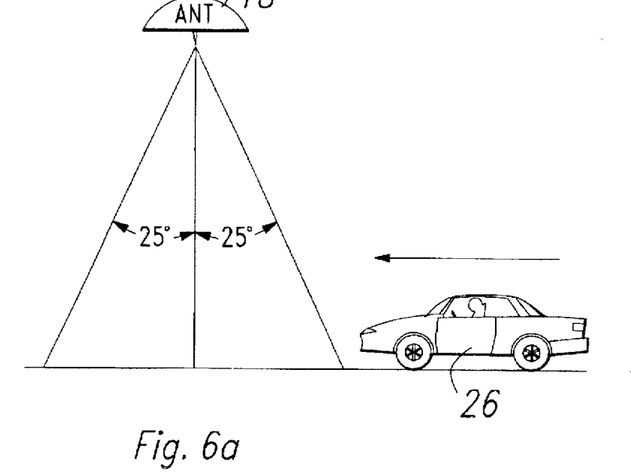
FIG. 6 is an overview of the dimensions of the interrogator antenna field pattern.
Figure 6B:
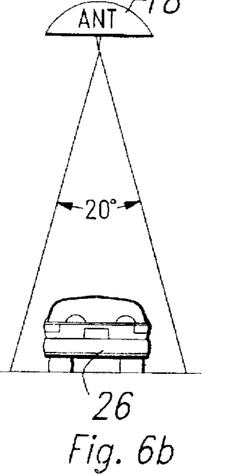

FIGS. 6a and 6b show the antenna geometry pattern for the preferred embodiment antenna 18. As previously mentioned, this antenna 18 is preferably a directional, slotted waveguide antenna 18. The antenna 18 preferably has a very steep shape factor as shown in FIG. 8 to provide a rapid loss in field strength as the antenna pattern approaches adjacent lanes. Antenna 18 will typically have a beamwidth (3 dB) of 50 degrees in the vertical plane as shown in FIG. 6a and will typically have a beamwidth (3 dB) of 20 degrees in the horizontal plane as shown in FIG. 6b. The horizontal beamwidth is positioned to just coincide with the width of the highway. The vertical beamwidth is used to illuminate a particular length of highway. In the described embodiment, the slotted waveguide antenna 18 is about 12 feet in width and as previously mentioned, has circular polarization. However, linear polarization might be used. Alternatively, elliptical or linear polarization might provide some advantage in certain environments.

Figure 7:
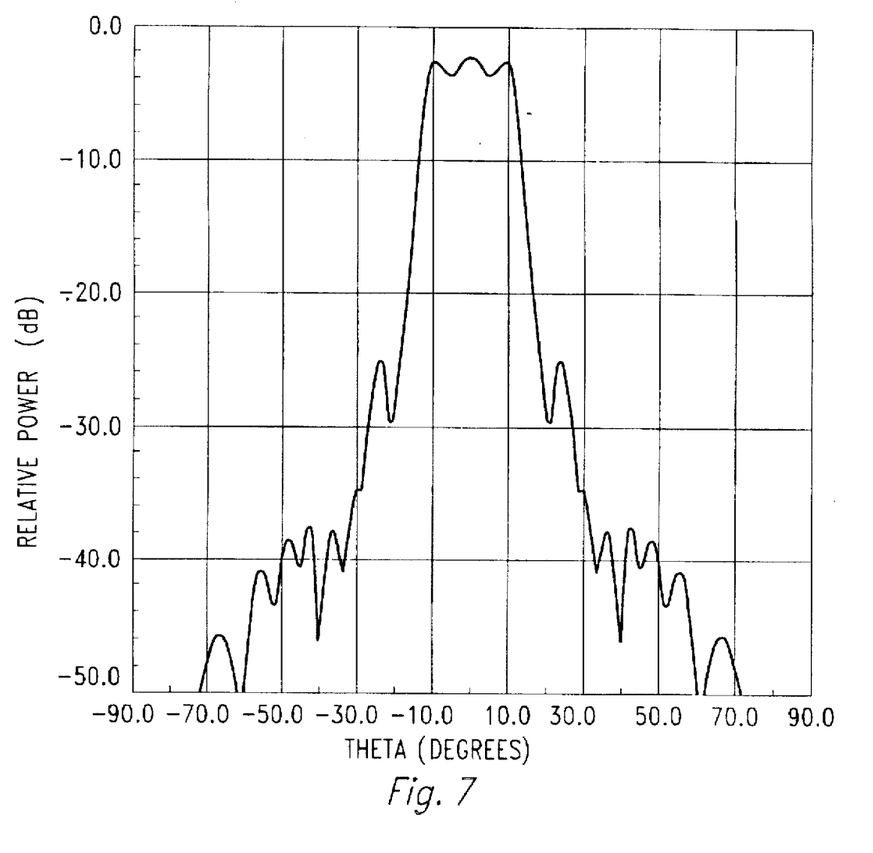
FIG. 7 is a single sided field pattern of the preferred embodiment interrogator antenna.

FIG. 7 shows a single-sided antenna field pattern for the described embodiment antenna. The antenna 18 of this embodiment uses a specially weighted aperture which results in a much steeper rate of rolloff of the field strength. This allows a sharper definition of the lane edges.

The sole table below comprises the terms used in this patent application, including some alternate and preferred terms. Other terms may be used which are not listed in the sole table.

TABLE

| Drawing Element | Generic Term | Preferred or Specific Term | Alternate Terms |
|---|---|---|---|
| 10 | Vehicle Identification System | Automatic Vehicle Identification System | AVI System |
| 12,12a,12b | Reader | Interrogator | |
| 14 | Transponder | Transponder | Responder, Tag |
| 16 | Host Computer | Toll Plaza Computer | Toll Booth Computer |
| 18 | Antenna | Directional Antenna | Interrogator Antenna |
| 20 | Electronics Module | Interrogator Electronics Module | |
| 22 | Interconnect | RF Interconnect | RF coax, Coaxial Cable |
| 24 | Connection | Host Connection | RS232 Connection, RS422 Connection |
| 26 | Vehicle | Vehicle | Automobile |
| 28a,28b | Lane | Vehicle Lane | |
| 30 | Antenna | Transponder Antenna | Tag Antenna, Responder Antenna |
| 31 | Integrated Antenna | Integrated Transponder Antenna | Integrated Transponder Reflector/Antenna |
| 32 | Detector | Field Strength Detector | |
| 34 | Comparator | Field Strength Comparator | |
| 36 | Demodulator | Field Strength Demodulator | |
| 38 | Control Circuit | Transponder Control Circuit | |
| 40 | Modulator | Backscatter Modulator | Transponder Modulator |
| 41 | Reflector | Modulated Reflector | |
| 42 | Wake-up Burst | Wake-up Burst | Activation Signal |
| 44 | Field Strength Pulse | First Field Strength Pulse | |
| 45 | Field Strength Pause | First Field Strength Pause | |
| 46 | Field Strength Pulse | Second Field Strength Pulse | |
| 47 | Field Strength Pause | Second Field Strength Pause | |
| 48 | Memory | Transponder Memory | |
| 50 | Reference Oscillator | Common Reference Oscillator | Reference Generator |
| 51 | Output | Output of Reference Oscillator | |
| 52 | Transmitter | Transmitter | Illuminator, Transmitter Module |
| 54 | Receiver | Receiver | Receiver Module, Demodulator |
| 56 | Control Circuit | Interface Circuit | |
| 58 | Modulator | | |
| 60 | Clock Frequency Multiplier | | |
| 62 | Buffer | Clock Buffer | |
| 64 | Amplifier | Power Amplifier | |
| 66$i$,66$q$ | Filter | Bandpass Filter | |
| 68$i$,68$q$ | Limiter | Limiter | Limiting Amplifier |
| 72 | Signal Splitter | Buffer | |
| 74 | Phase Shifter | 90° Phase Shifter | |
| 76$i$,76$q$ | Mixer | | |
| 78$i$,78$q$ | Buffer | | |
| 80 | Decoder | Digital FSK Decoder | |
| 82 | Circulator | | |
| 84 | Buffer | | |
| 86 | Signal Splitter | 3 dB Coupler | |
| 88 | Processing Circuitry | | |

A few preferred embodiments have been described in detail hereinabove. It is to be understood that the scope of the invention also comprehends embodiments different from those described, yet within the scope of the claims.

For example, display devices can be cathode ray tubes or other raster-scanned devices, liquid crystal displays, or plasma displays. "Microcomputer" in some contexts is used to mean that microcomputer requires a memory and "microprocessor" does not. The usage herein is that these terms can also be synonymous and refer to equivalent things. The phrase "processing circuitry" or "control circuitry" comprehends ASICs (application specific integrated circuits), PAL (programmable array logic), PLAs (programmable logic arrays), decoders, memories, non-software based processors, or other circuitry, or digital computers including microprocessors and microcomputers of any architecture, or combinations thereof. Memory devices include SRAM (static random access memory), DRAM (dynamic random access memory), pseudo-static RAM, latches, EEPROM (electrically-erasable programmable read-only memory), EPROM (erasable programmable read-only memory), registers, or any other memory device known in the art. Words of inclusion are to be interpreted as nonexhaustive in considering the scope of the invention.

Frequency shift keying (FSK) modulation is envisioned as a possible data modulation scheme, as well as pulse-pause modulation, amplitude shift keying (ASK), quadrature AM (QAM) modulation, quadrature phase shift keying (QPSK), or any other modulation. Different types of multiplexing such as time or frequency modulation might be effected to avoid cross-signal interference. Modulation might be effected by back-scatter modulation, by active modulation of a carrier, or by another method. Discrete components or fully integrated circuits in silicon (Si), gallium arsenide (GaAs), or other electronic materials families, as well as in optical-based or other technology-based forms and embodiments might be used to implement the circuits described herein. It should be understood that various embodiments of the invention can employ or be embodied in hardware, software or microcoded firmware.

Implementation is contemplated in discrete components or fully integrated circuits in silicon, gallium arsenide, or other electronic materials families, as well as in optical-based or other technology-based forms and embodiments. It should be understood that various embodiments of the invention can employ or be embodied in hardware, software or microcoded firmware.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An automatic vehicle identification system capable of vehicle lane discrimination, the system comprising:
    a) a first directional antenna focused on a first vehicle lane;
    b) a first interrogator unit in electrical communication with said first directional antenna, said interrogator unit being operable to transmit a first downlink message to, and to receive a first uplink message from, said first directional antenna;
    c) a second directional antenna focused on a second vehicle lane;
    d) a second interrogator unit in electrical communication with said second directional antenna, said interrogator unit being operable to transmit a second downlink message to, and to receive a second uplink message from, said second directional antenna;
    e) a remote transponder carried on a vehicle in one of said vehicle lanes, said transponder having a transponder antenna operable to receive RF transmissions and having a field strength comparator operable to receive signals from said transponder antenna and to compare a first field strength pulse received from said first directional antenna to a second field strength pulse received from said second directional antenna.

2. The automatic vehicle identification system of claim 1 and further comprising a toll plaza in which said first and second interrogator units and said first and second directional antennas are located, said toll plaza further comprising a reference oscillator which generates a reference carrier wave which is received by said first and second interrogator units such that said first and second interrogator units are coordinated in frequency.

3. The automatic vehicle identification system of claim 1 wherein said transponder further comprises a field strength detector which converts a signal supplied by one of said directional antennas to a voltage which upon exceeding a threshold activates said transponder.

4. The automatic vehicle identification system of claim 1 wherein said transponder further comprises a field demodulator which is operable to demodulate one of said downlink messages.

5. The automatic vehicle identification system of claim 1 wherein said transponder further comprises a control circuit, a modulated reflector, and a backscatter modulator electrically connected therebetween, said control circuit being operable to control said modulator and said reflector to backscatter modulate information onto said continuous wave illumination signal thereby generating an uplink message.

6. The method of claim 5 wherein said first interrogator unit further comprises a first receiver electrically interposed between said first directional antenna and said first control circuit, said receiver being operable to receive said uplink message and to transmit this uplink message to said first control circuit.

7. The automatic vehicle identification system of claim 5 wherein said modulated reflector and said transponder antenna are an integrated transponder antenna.

8. An automatic vehicle identification system capable of vehicle lane discrimination, the system comprising:
    a) a first directional antenna focused on a first vehicle lane;
    b) a second directional antenna focused on a second vehicle lane;
    c) a first remote transponder carried on a first vehicle in said first vehicle lane, said transponder comprising a first transponder antenna operable to receive RF transmissions, a first field strength detector which converts a signal supplied by said first transponder antenna to a voltage which upon exceeding a threshold activates said first transponder, a first field strength comparator which compares a first field strength pulse received from said first directional antenna by said first transponder antenna to a second field strength pulse received from said second directional antenna by said first transponder antenna, a first field demodulator which is operable to demodulate an amplitude modulated first downlink message from the signal supplied by said first transponder antenna, a first transponder control circuit which receives said first demodulated downlink message from said first field demodulator and a signal from said first field strength comparator indicating whether the first vehicle is travelling in said first lane or said second lane, and a first backscatter modulator which, upon reception by said first transponder control circuit said first downlink message, is operable to backscatter modulate a first continuous wave signal applied to said first transponder antenna to generate a first uplink message, said first backscatter modulator operating under control of said first transponder control circuit;

d) a second remote transponder carried on a second vehicle in said second vehicle lane, said transponder comprising a second transponder antenna operable to receive RF transmissions, a second field strength detector which converts a signal supplied by said second transponder antenna to a voltage which upon exceeding a threshold activates said second transponder, a second field strength comparator which compares a first field strength pulse received from said first directional antenna by said second transponder antenna to a second field strength pulse received from said second directional antenna by said second transponder antenna, a second field demodulator which is operable to demodulate an amplitude modulated second downlink message from the signal supplied by said second transponder antenna, a second transponder control circuit which receives said second demodulated downlink message from said second field demodulator and a signal from said second field strength comparator indicating whether the second vehicle is travelling in said first second lane or said second lane, and a second backscatter modulator which, upon reception by said second transponder control circuit said second downlink message, is operable to backscatter modulate a second continuous wave signal applied to said second transponder antenna to generate a second uplink message, said second backscatter modulator operating under control of said second transponder control circuit; and e) a toll plaza comprising
  i) a reference oscillator generating a reference carrier wave,
  ii) a first interrogator unit in electrical communication with said first directional antenna and with said reference oscillator, said interrogator unit having
    (1) a first transmitter which transmits a first wake-up burst which is of sufficient field strength at a first pre-selected distance to trigger said first field strength detector to activate said first transponder, transmits a downlink message to said first remote transponder, said downlink message being transmitted using On-Off Keying, and said transmitter further transmitting a first continuous wave illumination signal onto said first transponder so said first transponder may backscatter modulate said first continuous wave illumination signal to generate said first uplink message,
    (2) a first receiver for reception of said first uplink message and for separation of said first uplink message from spurious non-modulated reflections, and
    (3) a first control circuit for control of said first transmitter and said first receiver, said first control circuit operable to direct said first transmitter to send said first wake-up burst, followed by said first downlink message, said downlink message having periods of RF energy transmission including a first field strength pulse and periods during which no RF energy is transmitted including a first field strength pause, and said first control circuit still further operable to direct said first transmitter to send said first continuous wave illumination signal following said first downlink message and coincident with said first continuous wave illumination signal to direct said first receiver to receive said first uplink message; and
  iii) a second interrogator unit in electrical communication with said second directional antenna and with said reference oscillator, said second interrogator unit coordinated by said reference oscillator to said first interrogator unit and having
    (1) a second transmitter which transmits a second wake-up burst which is of sufficient field strength at a second pre-selected distance to trigger said second field strength detector to activate said second transponder, transmits a downlink message to said second remote transponder, said downlink message being transmitted using On-Off Keying, and said transmitter further transmitting a second continuous wave illumination signal onto said second transponder so said second transponder may backscatter modulate said second continuous wave illumination signal to generate said second uplink message,
    (2) a second receiver for reception of said second uplink message and for separation of said second uplink message from spurious non-modulated reflections, and
    (3) a second control circuit for control of said second transmitter and said second receiver, said second control circuit operable to direct said second transmitter to send said second wake-up burst, followed by said second downlink message, said downlink message having periods of RF energy transmission including a second field strength pulse during said first field strength pause and periods during which no RF energy is transmitted including the time during which said first field strength pulse is transmitted, and said second control circuit still further operable to direct said second transmitter to send said second continuous wave illumination signal following said second downlink message and coincident with said sending of said second continuous wave illumination signal to direct said second receiver to receive said second uplink message.

9. A method of identifying an object and determining in which of at least two areas the object is located, the method comprising:

a) focusing a first directional antenna on a first area;

b) focusing a second directional antenna on a second area;

c) transmitting a first field strength pulse by a first interrogator unit in electrical communication with said first directional antenna;

d) transmitting a second field strength pulse by a second interrogator unit in electrical communication with said second directional antenna; and e) comparing in a transponder the first field strength pulse received from said first directional antenna to the second field strength pulse received from said second directional antenna whereby the transponder can determine in which of the two areas it is located by the relative magnitude of the received first and second field strength pulses.

10. The method of claim 9 and further comprising the step of differentiating by said transponder between a downlink message from said first interrogator unit and a downlink message from a second interrogator unit.

11. The method of claim 10 wherein said first downlink message comprises said first field strength pulse and a first field strength pause and said second downlink message comprises a second field strength pause coincident with said first field strength pulse and a second field strength pulse coincident with said first field strength pause.

12. The method of claim 10 and further comprising the step of responding by said transponder with an uplink message to the interrogator unit associated with the directional antenna that is focused on the area in which the transponder is located.

13. The method of claim 12 wherein said uplink message is formed in said transponder by backscatter modulating a continuous wave illumination signal from said interrogator unit.

14. The interrogator of claim 13, said interrogator further operable to transmit a continuous wave illumination signal onto said transponder such that said transponder may backscatter modulate said continuous wave illumination signal thereby generating an uplink message.

15. The interrogator of claim 14 wherein said control circuit is still further operable to direct said transmitter to send said continuous wave illumination signal following said downlink message and coincident with said continuous wave illumination signal to direct said receiver to receive said uplink message.

16. The interrogator of claim 14 wherein said receiver is further operable to separate said uplink message from spurious non-modulated reflections.

17. The interrogator of claim 13 wherein said interrogator is housed in two modules.

18. The interrogator of claim 13 wherein said transmitter is further operable to transmit a wake-up burst, said wake-up burst being of sufficient field strength at a pre-selected distance to activate a remote transponder.

19. The interrogator of claim 13 wherein said interrogator is operable to receive a reference carrier wave whereby said interrogator's field strength pulse may be coordinated with another interrogator's field strength pause and whereby said interrogator's field strength pause may be coordinated with another interrogator's field strength pulse.

20. The interrogator of claim 13 and further comprising a host computer interface operable to communicate with a toll plaza computer that might coordinate the actions of all interrogators in a single toll plaza.

21. The interrogator of claim 13 and further comprising programmable circuitry operable to store site-programmable electrical parameters.

22. The interrogator of claim 13 wherein said site-programmable electrical parameters comprise interrogator lane location information.

23. The interrogator of claim 22 and further comprising a host computer interface operable to communicate with a toll plaza computer that might coordinate the actions of all interrogators in a single toll plaza.

24. The interrogator of claim 22 and further comprising programmable circuitry operable to store site-programmable electrical parameters.

25. The interrogator of claim 22 wherein said site-programmable electrical parameters comprise interrogator lane location information.

26. An automatic vehicle identification system capable of vehicle lane discrimination, the system comprising:

a. a first directional antenna focused on a first vehicle lane;
 b. a first interrogator unit in electrical communication with said first directional antenna, said interrogator unit being operable to transmit a first downlink message to, and to receive a first uplink message from, said first directional antenna;
 c. a second directional antenna focused on a second vehicle lane;
 d. a second interrogator unit in electrical communication with said second directional antenna, said interrogator unit being operable to transmit a second downlink message to, and to receive a second uplink message from, said second directional antenna; and
 e. a remote transponder carried on a vehicle in one of said vehicle lanes, said transponder having
   i. a transponder antenna operable to receive RF transmissions,
   ii. a field strength comparator operable to receive signals from said transponder antenna and to compare a first field strength pulse received from said first directional antenna to a second field strength pulse received from said second directional antenna,
   iii. a modulator operable to modulate a carrier with information contained within said remote transponder, and
   iv. a control circuit for receiving the results of said field strength comparison and for enabling said modulator.

27. The automatic vehicle identification system of claim 26 wherein said modulator is a backscatter modulator that is operable to backscatter modulate a continuous wave illumination signal from said interrogator unit by modifying the radar cross section of a modulated reflector under the direction of said control unit.

28. The automatic vehicle identification system of claim 27 wherein said modulated reflector and said transponder antenna form an integrated transponder antenna.

29. A remote transponder for communicating with an interrogator for the purposes of automatic vehicle identification, said transponder carried on a vehicle travelling on a vehicle lane and comprising:

a. a transponder antenna operable to receive RF transmissions;
 b. a field strength comparator operable to receive signals from said transponder antenna and to compare a first field strength pulse received from a first interrogator directional antenna to a second field strength pulse received from a second interrogator directional antenna; and
 c. a control circuit for receiving the results of said field strength comparison and for enabling said transponder to respond to interrogations from the interrogator associated with the vehicle lane in which the vehicle carrying said transponder is travelling.

30. The transponder of claim 29 and further comprising a modulator operable to modulate a carrier with information contained within said remote transponder.

31. The remote transponder of claim 29 wherein said modulator is a backscatter modulator that is operable to backscatter modulate a continuous wave illumination signal from said interrogator unit by modifying the radar cross section of a modulated reflector under the direction of said control unit.

32. The remote transponder of claim 31 wherein said modulated reflector and said transponder antenna form an integrated transponder antenna.

33. A toll plaza comprising:
   a. a first directional antenna focused on a first vehicle lane;
   b. a second directional antenna focused on a second vehicle lane;
   c. a first interrogator in electrical communication with said first directional antenna;
   d. a second interrogator in electrical communication with said second directional antenna;
   e. a control circuit for control of said first and second interrogator units, said control circuit operable to direct each of said first and second interrogator units to send selected periods of RF energy transmission wherein each interrogator unit sends an identifying field strength pulse via its respective directional antenna during a period in which no RF energy is transmitted from the other interrogator unit whereby said transponder may compare the first field strength pulse received from said first directional antenna to a second field strength pulse received from said second directional antenna.

34. The toll plaza of claim 33 and further comprising a third directional antenna focused on a third vehicle lane and a third interrogator unit in electrical communication with said third directional antenna and with said reference oscillator.

35. An interrogator for use in an automatic vehicle, said interrogator comprising:
   a. a transmitter, said transmitter operable to transmit a downlink message to said transponder; and
   b. a control circuit for control of said transmitter, said control circuit operable to direct said transmitter to send said downlink message, wherein said downlink message comprises periods of RF energy transmission including a field strength pulse and periods during which no RF energy is transmitted including a field strength pause, whereby a remote transponder may compare the amplitude, as received at said transponder, of said field strength pulse to the amplitude of another field strength pulse emitted by another interrogator during said field strength pause.

36. The interrogator of claim 35 wherein said interrogator further comprises a receiver for reception of said uplink message.

37. An interrogator for use in an automatic vehicle, said interrogator comprising:
   a. a transmitter, said transmitter operable to:
      i. transmit a wake-up burst, which is of sufficient field strength at a pre-selected distance to activate a transponder,
      ii. transmit a downlink message to said transponder, and
      iii. transmit a continuous wave illumination signal onto said transponder such that said transponder may backscatter modulate said continuous wave illumination signal thereby generating an uplink message;
   b. a receiver for reception of said uplink message and for separation of said uplink message from spurious non-modulated reflections; and
   c. a control circuit for control of said transmitter and said receiver, said control circuit operable to direct said transmitter to send said wake-up burst, followed by said downlink message, said downlink message having periods of RF energy transmission including a field strength pulse and periods during which no RF energy is transmitted including a field strength pause, and said control circuit still further operable to direct said transmitter to send said continuous wave illumination signal following said downlink message and coincident with said continuous wave illumination signal to direct said receiver to receive said uplink message.

* * * * *